F. W. FLUHRER.
MECHANICAL MOVEMENT.
APPLICATION FILED DEC. 30, 1912.

1,110,677.

Patented Sept. 15, 1914.
2 SHEETS—SHEET 1.

F. W. FLUHRER.
MECHANICAL MOVEMENT.
APPLICATION FILED DEC. 30, 1912.

1,110,677.

Patented Sept. 15, 1914.
2 SHEETS—SHEET 2.

Witnesses:

Fred W. Fluhrer, Inventor,
By R. C. Wright, Atty.

UNITED STATES PATENT OFFICE.

FRED W. FLUHRER, OF MAYGER, OREGON.

MECHANICAL MOVEMENT.

1,110,677.  Specification of Letters Patent.  Patented Sept. 15, 1914.

Application filed December 30, 1912.  Serial No. 739,351.

*To all whom it may concern:*

Be it known that I, FRED W. FLUHRER, a citizen of the United States, residing at Mayger, in the county of Columbia and State of Oregon, have invented a new and useful Improvement in Mechanical Movements, of which the following is a specification, reference being had to the accompanying drawings.

My invention relates to a class of devices used for various machines used in manufacturing.

The object of my invention is to provide a device of that class, wherein a mechanical movement is arranged by means of which a carriage can be drawn on a pre-determined length of travel, with a uniform and slow movement toward a saw to feed the same and, after the saw has passed through the material, the said mechanism will cause a quick return of the carriage to its position for beginning the next feed to the saw. I attain these objects, as well as other advantages, by the construction, combination and arrangement of parts illustrated in the accompanying drawings which form a part hereof.

Figure 2:
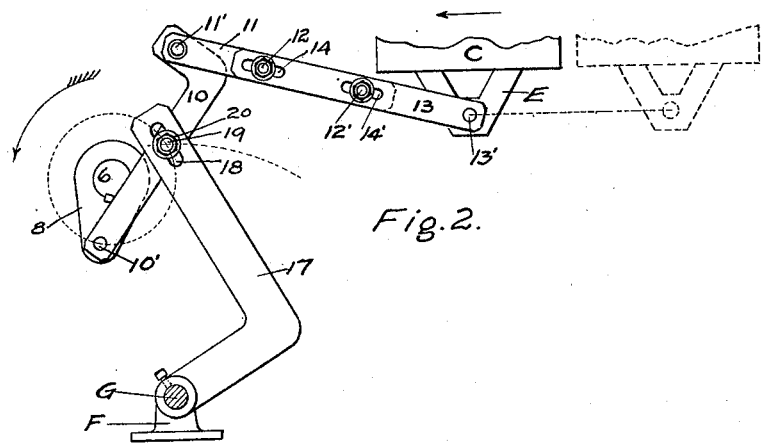
Figure 1:
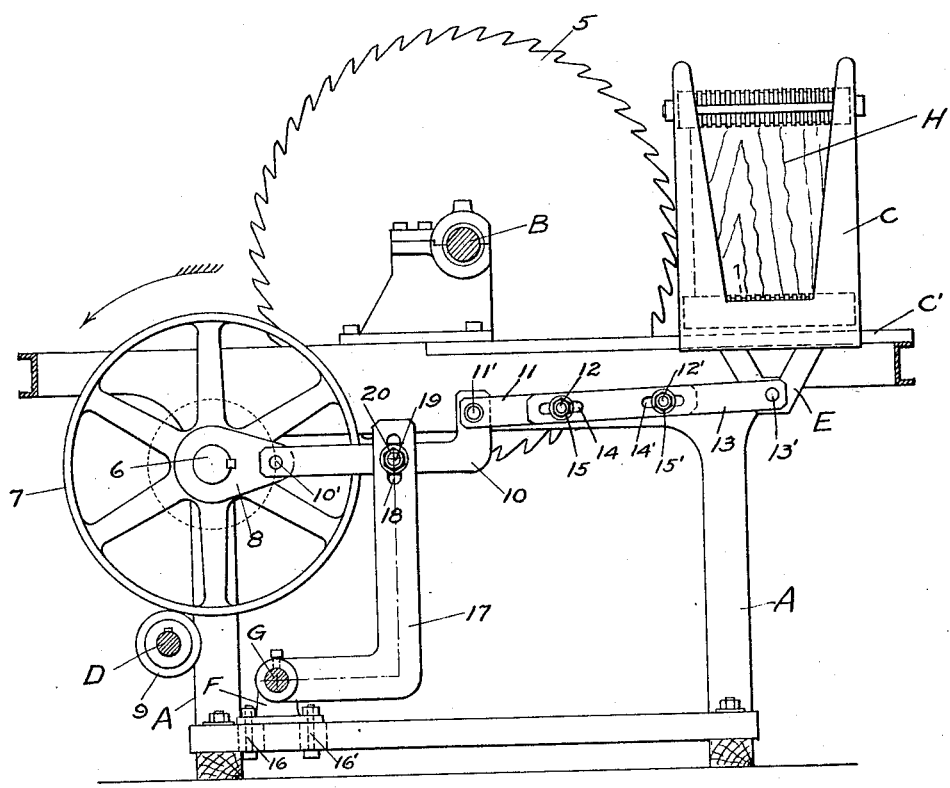
Figure 4:
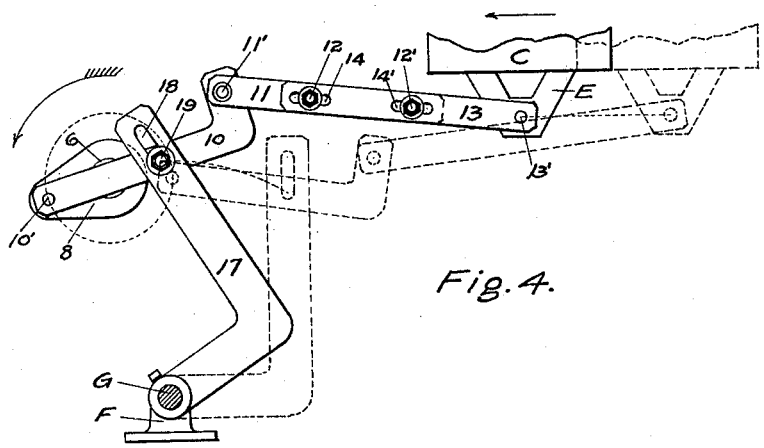
Figure 3:
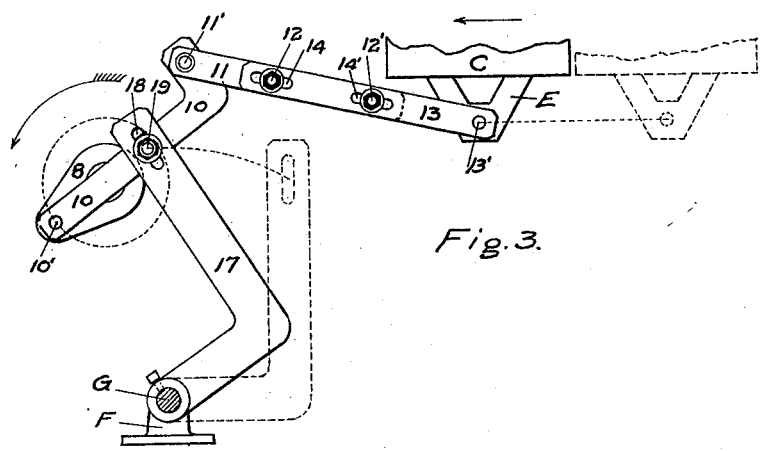

Figure 1 is a sectional side elevation of a shingle sawing machine with my mechanical movement arranged therein, the carriage being shown in full elevation and at its starting point to begin the feed. Fig. 2 is a side elevation of parts of the machine, with the parts for the mechanical movement shown in the position they assume when the carriage is at its maximum position after finishing the feed, and opposite to that shown in Fig. 1. Fig. 3 is a side elevation showing similar parts as in Fig. 2 and with the controlling arm of my mechanical movement having reached its maximum position, while the carriage has not. Fig. 4 is a side elevation showing the same parts, but with the guide pin for the controlling arm secured at the lower end of the slot in which it is placed.

All the dotted lines in the several figures show the course of the movement of related parts.

My mechanical movement is here shown in connection with a shingle sawing machine of a simple type.

Like letters and numerals refer to like parts throughout the views.

A is the frame of a shingle sawing machine.

B is a rotatable shaft or arbor mounted on the upper part of the frame A and this shaft carries a circular saw 5.

C is a sliding carriage of suitable shape and dimensions to receive and hold a shingle bolt H to the saw 5, and has a bracket E secured to its lower surface. The carriage slides in guides C'.

A rotatable shaft 6 is mounted in bearings at the forward end of the frame. A pulley 7 is rigidly secured on the shaft 6 near its end. A crank 8 is rigidly secured upon the end of the shaft 6 next to the pulley 7.

A rotatable shaft D is mounted in bearings in the lower part of the frame near the pulley 7. A friction wheel 9 is rigidly secured upon the shaft D in a position to engage the pulley 7. From the crank 8 a link system extends in a longitudinal direction to a connection with the carriage C. The first member of this system is an angled arm 10. The longitudinal part of this arm is pivoted at its end on the end of the crank 8 by a pivot pin 10'. A second link 11 is pivoted at one end on the end of the vertical part of the arm 10 by a pivot pin 11'. The link 11 is provided with two adjusting bolts 12—12'. A third link 13 is pivoted at one end on the carriage bracket E by a pivot pin 13'. The link 13 has longitudinal slots 14—14' through which pass the bolts 12—12'. Nuts 15—15' are provided to secure the links 11 and 13 together in adjusted position so as to form a single link connection.

F is one of two like brackets movable longitudinally in the frame and secured in the lower part thereof by bolts 16—16'.

G is a rocking pivot shaft mounted in bearings in the brackets F. A right angled controlling arm 17 is secured at the end of its longitudinal part on the pivot shaft G. Its vertical part is provided with a slot 18. The arm 10 is provided with a guide pin 19 on its longitudinal part, which pin extends through the slot 18 of the arm 17. A nut 20 secures the guide pin in the slot. The controlling arm may be made straight instead of angled, as shown, and extend in a direct course from the rocking shaft to the guide pin.

The shafts B and D are connected with any suitable power source and serve to transmit power to the mechanism of the machine.

It is well known that where a direct connection is made between the crank and a carriage like that here shown, it is necessary that the crank throw be increased over that of the crank 10 for a like travel of the carriage C. It is also well known that with such connection the carriage will travel at an increasing speed from the zero start to maximum and from thence to zero at the limit of travel and the same movement prevails on the return travel.

It will now be observed, that my device takes up the increasing motion of the link connection on the forward travel, and gives it out on the return, thus accomplishing a practically uniform speed of travel for the carriage while feeding a shingle bolt to the saw, and permitting it to be quickly returned to starting position for the next feed. This arrangement also permits of a lesser crank throw than upon a direct connection. For example the crank throw may be X and the carriage travel approximately one and one-half times X for my device as illustrated.

While I have shown the arm 17 as a right angled arm, this construction was followed only in order to aid in making a good clearance of parts of the machine upon which I was then experimenting. A straight arm from the shaft G to the guide pin 19 will accomplish the same result and it is the length of the direct distance between these points which governs in either case.

In arranging my mechanical movement for a shingle machine, I have found that I can attain by it a practically uniform forward movement of the carriage, as illustrated in Figs. 1, 2 and 3. It will be noted that in order to obtain this result, it is necessary to arrange an arm 10 as the first member of the link system connected with the crank, in order to retain a movement of the remaining links as nearly longitudinal as possible. To obtain a correct adjustment of the arm 17, it is then necessary to secure the guide pin 19 on the arm 10 in a suitable location. My device permitting of a lesser crank throw than upon direct movement, it is apparent that a crank of convenient length may be chosen. It will then be observed that I have the crank pivot pin 10', the guide pin 19 and the link pivot pin 11' each in an established and fixed position with relation to each other and to the controlling arm 17. It will be next apparent that the arm 10 can be adjusted, either by raising or lowering the pin 19 in the slot 18 of the controlling arm 17. Also that this will vary the radius of the arc of travel of the guide pin 19, according to the distance between the rocking shaft G and the guide pin 19, which always constitutes that radius, whether said arm 17 be straight or angled. The travel of the carriage C will be increased or decreased respectively, in proportion to the increase or decrease of the said radius. Fig. 4 exhibits the relation where the radius is decreased. It will also be seen that if the rocking shaft G be moved forward or backward, it will shift the arc of travel of the guide pin downward or upward and proportionately increase or decrease the travel of the carriage. The arm 10 may be adjusted by moving both the guide pin 19 and the shaft G for the same adjustment of carriage travel and to facilitate the movement of all parts.

The primary object of my invention is to obtain a speed of the carriage which will enable it to feed the shingle bolt to the saw properly and uniformly so that a successful cut can be made, and after the same has been accomplished, to make a quick return of the carriage to the starting point for the next feed, thus making the machine more rapid and economical in its work.

A secondary object is to make the arrangement and adjustment as I indicate, so that no parts will bind or catch, and interfere with or prevent the smooth and free operation of the machine, and particularly of the carriage mechanism.

It will be noted that guide pin 19, because of its limited and defined course on the arc described, becomes the fulcrum for the link arm 10 as it performs the function of a lever between the crank and the succeeding links. It will also be observed that the function of the links 11 and 13 is to afford means to arrange the position of the carriage C on the guides C' with relation to the saw. Finally it will appear, that by the arrangement of my device, and its proper adjustment, the practically uniform speed of forward carriage travel, and the increased speed of its return can all be practically and satisfactorily pre-determined. It is these features and the principles which make them possible that I claim to be new in my arrangement of this mechanical movement in my device.

Having thus described my invention I claim:—

1. A mechanism for a gradual forward and a quick return of a reciprocating member on a horizontal plane, comprising a link system consisting of a first member, a second member having one end pivoted on one end of the first member and its opposite end pivoted on a reciprocating member movable horizontally, a rocking shaft pivotally secured below the link system, means to allow said shaft to be moved longitudinally with the link system and to be secured in a correlated position therewith, a reciprocating arm having its lower end rigidly secured on said rocking shaft, means to pivotally secure the upper end of the reciprocating arm upon the first member of the link system in a correlated position with respect to said system and its attached reciprocating member, substantially as described.

2. A mechanism for a gradual forward and a quick return of a reciprocating member on a horizontal plane, comprising a link system consisting of a first member, a second member of two parts, means to secure said parts to each other to make the second member of a desired length, said second member having one end pivoted on one end of the first member and its opposite end pivoted on a reciprocating member movable horizontally, a rocking shaft pivotally secured below the link system, means to allow said shaft to be moved longitudinally with the link system and to be secured in a correlated position therewith, a reciprocating arm having its lower end rigidly secured on said rocking shaft, means to pivotally secure the upper end of the reciprocating arm upon the first member of the link system in a correlated position with respect to said system and its attached reciprocating member, substantially as described.

FRED W. FLUHRER.

Witnesses:
WM. BEE,
JOHN STUCKENBERG.

Copies of this patent may be obtained for five cents each, by addressing the "Commissioner of Patents, Washington, D. C."